United States Patent
Gaillard et al.

(10) Patent No.: US 11,603,721 B2
(45) Date of Patent: Mar. 14, 2023

(54) COILED TUBING REEL TRAILER

(71) Applicant: Halliburton Energy Services, Inc., Houston, TX (US)

(72) Inventors: Philippe Herve Gaillard, Houston, TX (US); Terence Patrick Toal, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 709 days.

(21) Appl. No.: 16/696,599

(22) Filed: Nov. 26, 2019

(65) Prior Publication Data
US 2020/0256139 A1 Aug. 13, 2020

Related U.S. Application Data

(60) Provisional application No. 62/804,047, filed on Feb. 11, 2019.

(51) Int. Cl.
| | | |
|---|---|---|
| *E21B 19/22* | (2006.01) | |
| *B65H 75/42* | (2006.01) | |
| *B60P 3/40* | (2006.01) | |
| *B60P 1/02* | (2006.01) | |
| *B62D 49/02* | (2006.01) | |

(52) U.S. Cl.
CPC .............. *E21B 19/22* (2013.01); *B60P 1/02* (2013.01); *B60P 3/40* (2013.01); *B62D 49/02* (2013.01); *B65H 75/425* (2013.01)

(58) Field of Classification Search
CPC ... E21B 19/22; B60P 3/40; B60P 1/02; B62D 49/02
See application file for complete search history.

(56) References Cited

U.S. PATENT DOCUMENTS

| | | |
|---|---|---|
| 4,819,955 A | 4/1989 | Cobb |
| 4,945,938 A | 8/1990 | Ponsford et al. |
| 8,118,523 B2 | 2/2012 | Pedersen |
| 9,511,702 B2 | 12/2016 | Ross |

(Continued)

FOREIGN PATENT DOCUMENTS

| | | |
|---|---|---|
| CN | 206781612 | 12/2017 |
| EP | 1558464 | 8/2005 |

OTHER PUBLICATIONS

International Search Report and Written Opinion for Application No. PCT/US2019/067024, dated Apr. 20, 2020.

*Primary Examiner* — Sang K Kim
(74) *Attorney, Agent, or Firm* — Thomas Rooney; C. Tumey Law Group PLLC (57) ABSTRACT

A method may comprise attaching a spool support frame to a forward bogie and an aft bogie, lifting the cargo, supported by a spool support frame with a forward hydraulic arm and an aft hydraulic arm. A transportation system may comprise a forward bogie, an aft bogie, and a spool support frame. The forward bogie may include a plurality of axel groups configured to operate independently of each other, a forward arm attached to the forward bogie through a swivel connection, and a forward hydraulic arm attached to the forward arm through a rod. The aft bogie may include a plurality of aft axel groups configured to operate independently of each other, an aft arm attached to the aft bogie through an aft swivel connection, and an aft hydraulic arm attached to the aft arm through an aft rod.

20 Claims, 11 Drawing Sheets

(56) References Cited

U.S. PATENT DOCUMENTS

| | | |
|---|---|---|
| 2003/0006034 A1 | 1/2003 | Neal |
| 2003/0042705 A1 | 3/2003 | French et al. |
| 2004/0091346 A1 | 5/2004 | Wobben |
| 2008/0023227 A1* | 1/2008 | Patton .................... E21B 7/02 175/203 |
| 2010/0111633 A1 | 5/2010 | Pedersen |
| 2012/0201636 A1 | 8/2012 | Pedersen |
| 2015/0003954 A1 | 1/2015 | Koerner et al. |
| 2015/0315861 A1 | 11/2015 | Zachariasen et al. |

\* cited by examiner

FIG. 24

COILED TUBING REEL TRAILER

BACKGROUND

In the oil and gas industry, goods of large volume may cause substantial problems during handling or transportation when they are unsuitable for containerized transport, for example on account of their dimensions and/or weight. Such loads may be restricted to methods of transportation, may be broken into many different shipments, and/or built at job sites due to their large size.

Currently, methods and systems for moving goods of large volume may further be hampered by currently constructed roadways and the width the goods of large volume may require for transportation. As oil and gas wells are drilled deeper horizontally and/or vertically, machines and/or devices that may be used to services those wells may continue to grow in length. For example, coil tubing pipe may be used in well intervention, which is delivered on a reel and used for wellsite operations. As wells get deeper or constructed with longer horizontal sections, longer lengths of coil tubing may be needed to reach the required depth, which may increase the length of reel and/or spool width. However, current technology is inadequate in being able to transport new devices, systems, and machines to services these longer wells.

BRIEF DESCRIPTION OF THE DRAWINGS

These drawings illustrate certain aspects of some of the embodiments of the present disclosure, and should not be used to limit or define the disclosure.

DETAILED DESCRIPTION

This disclosure presents a system and method to address logistical challenges of coiled tubing operations and/or extended reach operations in the oil and gas industry. The transportation system discussed below may provide a system for moving cargo, such as coiled tubing pipe and or coiled tubing pipe on coil tubing reel and may allow an almost unlimited pipe length to be transported and used at any location. This may be accomplished by loading cargo, in examples a reel and/or a spool, along the axial direction of the transportation system, which is in the direction of the road. This prevents the width of the cargo from extending into the road and/or other lanes of traffic. Additionally, the transportation system may accept spools of various sizes, making one trailer design fit all the requirements in pipe size and pipe length. For pad work, (where space is limited) the transportation system may allow for shifting from one well to the next with minimal rig down and rig up operation using bogies to spot and re-spot the entire unit. As described in further detail below, a bogie is a chassis or framework that carries a wheel set. The bogie may be attached to a vehicle and a transportation system and may be utilized to transport cargo, people, and/or the like.

Figure 1:
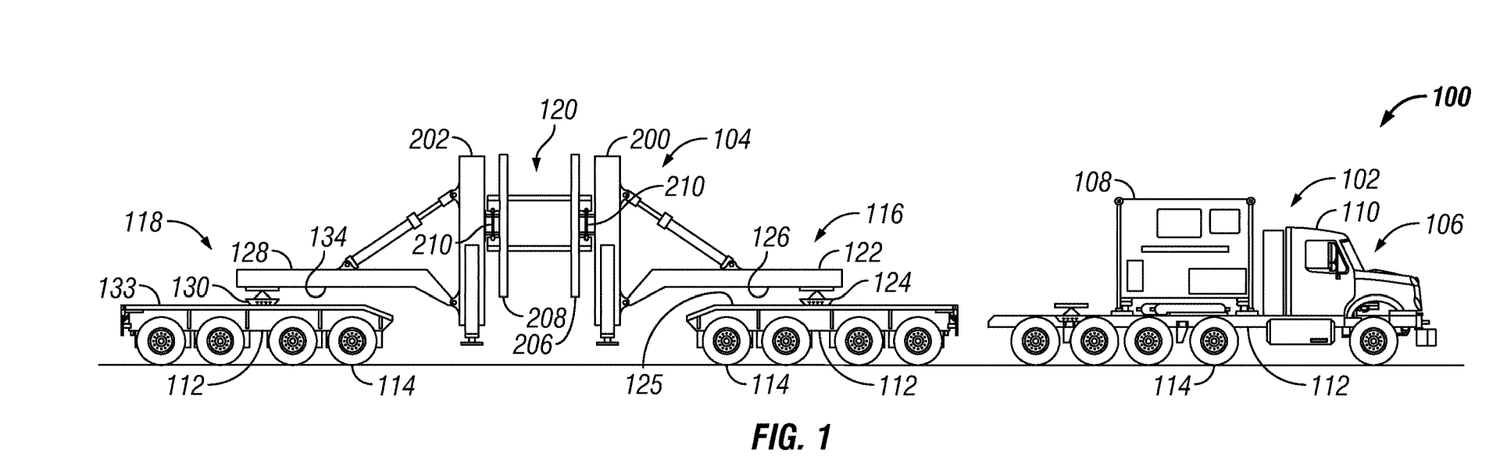
FIG. 1 is a schematic diagram of an example of a transportation system.

FIG. 1 is a schematic diagram of transportation system 100. Transportation system 100 may be operate and function to transport oil field equipment from a first location to a second location. During operations, as a wheeled vehicle, transportation system 100 may traverse down any suitable road that may be able to bear the weight of transportation system 100. Transportation system 100 may including a plurality of axle groups that may further be modular. Each axle group may operate and/or function separate and apart from each other. Each axle group may include any number of wheels, for example, two wheels, four wheels, six wheels, eight wheels, or more. The plurality of axle groups may allow transportation system 100 to ride over concrete streets, concrete highways, dirt roads, paved roads, asphalt roads, and/or the like. This may allow transportation system 100 to safely transport cargo such as oil field equipment to any destination. To transport cargo, transportation system 100 may be divided into a tractor section 102 and a trailer section 104.

Tractor section 102, as illustrated in FIG. 1, may further include a tractor head 106 and an operations cabin 108. While not illustrated, tractor head 106 may house an engine which may act as a power plant for moving transportation system 100. In examples, the engine may also act a generator to power operations cabin 108 and cargo that may be transported by transportation system 100. Operations cabin 108 may include control mechanism such as computer and computer systems which may control hydraulic systems, electrical system, and/or the like. As discussed below, operations cabin 108 may control the load and unloading of cargo, the utilization of cargo, movement of the transportation system, and/or the like. As illustrated, tractor head 106 may include a driver cabin 110. Driver cabin 110 may act as location in which personnel may control and guide transportation system 100 from a first location to a second location over roads and/or terrain. Additionally, driver cabin 110 may also allow personnel to control the engine disposed in tractor head 106 when the engine may function as a generator to power operations cabin 108 and/or cargo that may be transported by transportation system 100. Driver cabin 110 may also house personnel during operations in which transportation system 100 may operate as a vehicle over toads and/or terrain. As illustrated in FIG. 1, tractor section 102 may include a chassis 112 which may be supported and/or lifted off the ground by one or more wheels 114. As discussed above, wheels 114 may allow tractor section 102 to traverse over roads and/or terrain while supporting chassis 112 In turn, chassis 112 may support tractor head 106 and operations cabin 108.

As transportation system 100 may be operating as a vehicle, operations cabin 108 may be inactive. However, once transportation system 100 may be at a pre-determined destination, operations cabin 108 may be activated by personnel. Operations cabin 108 during work operations may be attached to and/or control cargo being transported by transportation system 100 and/or the engine, which may act as a generator for work operations. As discussed in further detail below, operations cabin 108 during work operations may control all functions of transportation system 100 and work that may be performed by the cargo, which may be housed in trailer section 104.

Trailer section 104 may include a forward bogie 116, an aft bogie 118, and a spool support frame 120. As illustrated in FIG. 1, forward bogie 116 and aft bogie 118 may include chassis 112 and one or more wheels 114. It should be noted that wheels 114 may each have steerable axles, which may allow each wheel and/or a pair of wheels to be independently controlled. This may allow both forward bogie 116 and aft bogie 118 to maneuver in tight space. As discussed above, wheels 114 may support and/or lift chassis 112 above terrain and/or roads. In turn, chassis 112 may support devices, mechanisms, spool support frame 120, and/or the like. For example, referring to forward bogie 116, chassis 112 may support forward arm 122. Forward arm 122 may be structural steel and/or the like to support cargo in spool support frame 120. Additionally, aft bogie 118 and its chassis 112 may support aft arm 128. Aft arm 128 may structural steel and/or the like to support cargo in spool support frame 120.

As noted above, swivel mount 124 may support forward arm 122 on chassis 112 of forward bogie 116. Additionally, aft swivel mount 130 may support aft arm 128 on chassis 112 of aft bogie 118. In examples, swivel mount 124 and aft swivel mount 130 may be a ball in sock joint, a fifth wheel connection, a goose neck connection, a ball-race-bearing, and/or the like. Swivel mount 124 may allow for vertical rotation, clockwise or counterclockwise, between forward bogie 116 and forward arm 122 as well as between aft arm 128 and aft bogie 118. In examples, swivel mount 124 may be attached at any suitable location on top of surface 125 of chassis 112. Additionally, swivel mount 124 may also be attached at any suitable location to a bottom surface 126 of forward arm 122. Swivel mount 124 may allow forward arm 122 to move vertically and/or horizontally in relation to forward bogie 116. This may isolate spool support frame 120 from forward bogie 116, which may allow spool support frame 120 to move independently of forward bogie 116 and vice versa, which may reduce stress, shock, and other forces on spool support frame 120 which may be experienced during transportation operations.

In examples, aft swivel mount 130 may be attached at any suitable location on top surface 133 of chassis 112 for aft bogie 118. Additionally, aft swivel mount 130 may also be attached at any suitable location to a bottom surface 134 of aft arm 128. Aft swivel mount 130 may allow aft arm 128 to move vertically and/or horizontally in relation to aft bogie 118. This may isolate spool support frame 120 from aft bogie 118, which may allow spool support frame 120 to move independently of forward bogie 116 and vice versa, which may reduce stress, shock, and other forces on spool support frame 120 which may be experienced during transportation operations.

Figure 2:
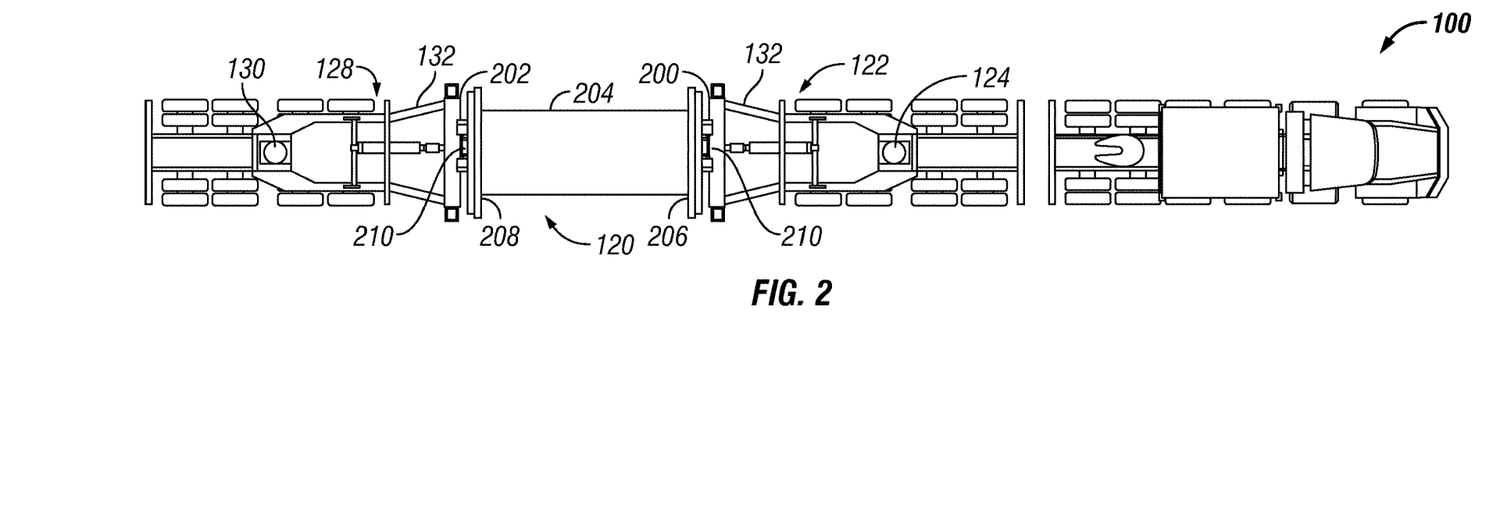
FIG. 2 is a schematic diagram from a top view of the transportation system of FIG. 1.

As illustrated in FIG. 2, which is a top view of transportation system 100, forward arm 122 may be a U-shaped frame which attaches to swivel mount 124 at one end and spool support frame 120 at the opposite end. Additionally, aft arm 128 may be a U-shaped frame which attaches to aft swivel mount 130 at one end and spool support frame 120 at the opposite end. FIG. 2 further illustrates cargo 204 as a spool. In examples, coiled tubing (not illustrated) may be wound around the spool after the spool may be secured within transportation system 100, discussed below. Additionally, the spool, may receive coiled tubing that is spun around the spool while loaded on transportation system 100. This may cause rotational forces, such as torque, either in a clockwise and/or counter-clockwise rotation. Outriggers 214, discussed below, may be employed to counter rotation to prevent torque and possible toppling of spool support frame 120 during operations.

In some embodiments, cargo 204 may be any suitable oil field device, material, tool, and/or the like. In this example, cargo 204 may form a structure, such as a reel or spool, in which coiled tubing (not illustrated) may be wrapped around. To support cargo 204, cargo 204 may be disposed in support frame 120 or between forward receiver 200 and aft spool connector 202, discussed below.

Figure 3:
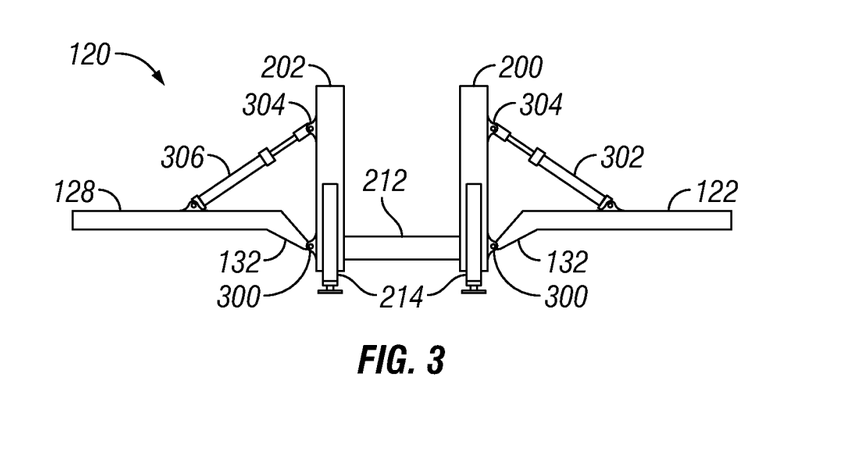
FIG. 3 is a side view of a spool support frame.
Figure 4:
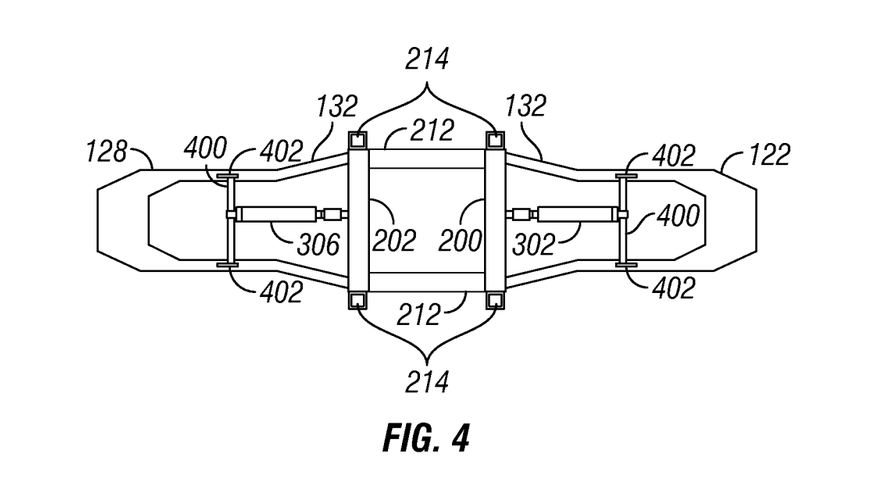
FIG. 4 is a top view of the spool support fame of FIG. 3.

FIGS. 3 and 4 illustrate a detailed side view and a detailed top view of forward arm 122 and aft arm 128 attached to spool support frame 120. As illustrates, spool support frame 120 is a structural cradle that includes a forward receiver 200 attached to an aft receiver 202 by one or more lateral supports 212. Additionally, spool support frame 120 may further include one or more outriggers 214. At least one outrigger 214 may be disposed on at least one side of forward receiver 200 and aft receiver 202. In examples, outriggers 214 may be disposed on both sides of forward receiver 200 and aft receiver 202. With continued reference to FIGS. 3 and 4, forward arm 122 and aft arm 128 may be a U-shaped frame. The U-shaped frame of forward arm 122 may include forward arm 122 and connections 132, which may be formed to forward arm 122, which attach forward arm 122 to a forward receiver 200. It should be noted that connections 132 may be formed to forward arm 122 at about a fourth five-degree angle. As illustrated, forward arm 122 may attach forward receiver 200 through connection 132 at hinge joint 300 at one end of forward receiver 200, which may allow forward receiver 200 to move horizontally around hinge joint 300 in relation to forward arm 122. A forward armature 302 may be attached to forward receiver 200 at armature hinge joint 304 at an end of forward receiver 200 opposite hinge joint 300. It should be noted that forward armature 302 may be hydraulically operated, electrically operated, and/or pneumatically operated. In some embodiments, hydraulic armatures, electrical armatures, and/or pneumatic armatures may be operated and/or controlled by a hydraulic system, an electric system, or a pneumatic system, respectively. During operations, forward armature 302 may expand and contract, which may be controlled by operations cabin 108 and/or tractor head 106. During loading operations, forward armature 302 may expand to lift cargo 204 (e.g., referring to FIG. 2) for transportation. During work operations forward armature 302 may contract, which may drop cargo 204 to the surface in preparation for working operations. In examples, forward armature 302 may attach to spool support frame 120 at one end and forward arm 122 at the opposite end of forward armature 302. Additionally, forward armature 302 may attach to forward arm 122 through a brace 400. In some examples, brace 400 may be a rod that attaches to forward arm 122 at two brace hinge joints 402. However, it should be noted that brace 400 may be any type of structure, such as an I-beam and/or the like, which may allow forward armature 302 to attach.

With continued reference to FIGS. 3 and 4, aft arm 128 may also be a U-shaped frame. The U-shaped frame of aft arm 128 may include connections 132 which may be formed to aft arm 128 and attach aft arm 128 to an aft receiver 202. In examples, aft arm 128 may attach aft receiver 202 through connection 132 at hinge joint 300 at one end of aft receiver 202, which may allow aft receiver 202 to move horizontally around hinge joint 300 in relation to aft arm 128. An aft armature 306 may be attached to aft receiver 202 at hydraulic hinge joint 304 at an end of aft receiver 202 opposite hinge joint 300. It should be noted that aft armature 306 may be hydraulically operated, electrically operated, and/or pneumatically operated. In some examples, hydraulic armatures, electrical armatures, and/or pneumatic armatures may be operated and/or controlled by a hydraulic system, an electric system, or a pneumatic system, respectively. During loading operations aft armature 306 may expand to lift cargo 204 (e.g., referring to FIG. 2) for transportation. During work operations aft armature 306 may contract, which may drop cargo 204 to the surface in preparation for working operations. In examples, aft armature 306 may attach to spool support frame 120 at one end and aft arm 128 at the opposite end of aft armature 306. In examples, aft armature 306 may attach to aft arm 128 through an aft brace 400. FIG. 4 illustrates aft brace 400 to be a rod that attaches to aft arm 128 at two brace hinge joints 402. However, it should be noted that aft brace 400 may be any type of structure, such as an I-beam and/or the like, which may allow aft armature 306 to attach.

It should be noted that aft armature 306 and forward armature 302 may operate together to lift and/or drop cargo 204 (e.g., referring to FIG. 2) as both aft armature 306 and forward armature 302 expand and/or contract their respective hydraulic or electric or pneumatic piston. Both aft armature 306 and forward armature 302 may be controlled by operations cabin 108 and/or tractor head 106 to synchronize and/or control the functioning of aft armature 306 and forward armature 302.

Figure 5:
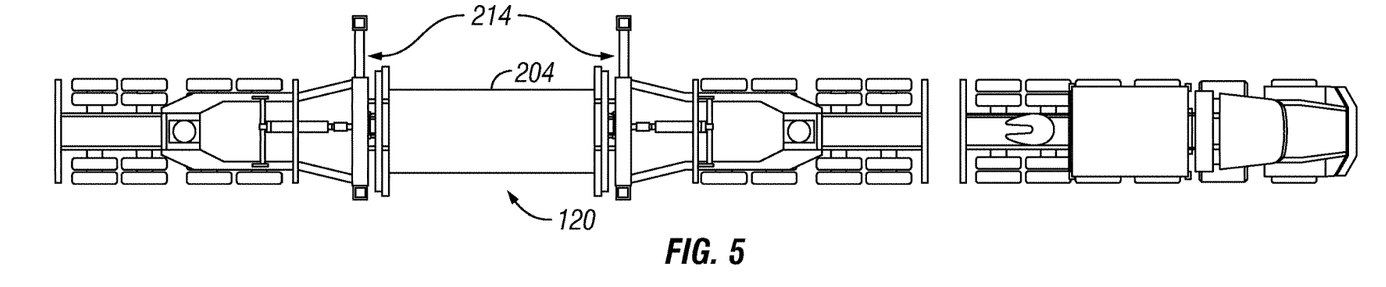
FIG. 5 is an example of outriggers deployed in a transportation system.

FIG. 5 illustrates an example of load operations or unloading operations of spool support frame 120 with cargo 204. As illustrated, one or more outriggers 214 disposed on forward receiver 200 and/or aft receiver 202 and lowered until one or more outrigger 214 touch the ground. Engaged with the ground, outriggers 214 may support the weight of spool support frame 120, which may allow for spool support frame 120 to be de-attached or attached to forward receiver 200 and/or aft receiver 202. This may allow spool support frame 120 to be lowered to the ground or raised from the ground with forward armature 302 or aft armature 306, as described above. In some examples, outriggers 214 may provide additional support by applying force in the opposite direction of the clockwise or counter-clockwise rotation of cargo 204 during loading operations, unloading operations, and/or drilling operations. In examples, one or more outriggers 214 may be disposed within and/or on any side of forward receiver 200 and/or aft receiver 202. In examples outriggers 214 may be operated hydraulically. In some examples, outriggers 214 may include footings attach to outriggers 214 by a hinge joint, ball and socket, joint, and/or the like, which may allow the footing to pivot in any direction in relation to outriggers 214. This may function to allow the footings to make solid contact with a surface and support and/or stabilize spool support frame 120.

To lower cargo 204 to the surface, outriggers 214 may be expanded to the surface to support the weight of spool support frame 120. Once outriggers 214 may be expanded, aft armature 306 and forward armature 302 may be unlocked and each piston may be retracted while outriggers 214 may be retracted, which may lower spool support frame 120 to the surface, further discussed below in FIGS. 6 and 7. It should be noted that the lifting and lowering of spool support frame 120 may be controlled by operations cabin 108 or tractor head 106. For example, outriggers 214, aft armature 306, and forward armature 302 may each be individually controlled and controlled together by operations cabin 108 or tractor head 106 to lift and/or lower cargo.

Figure 6:
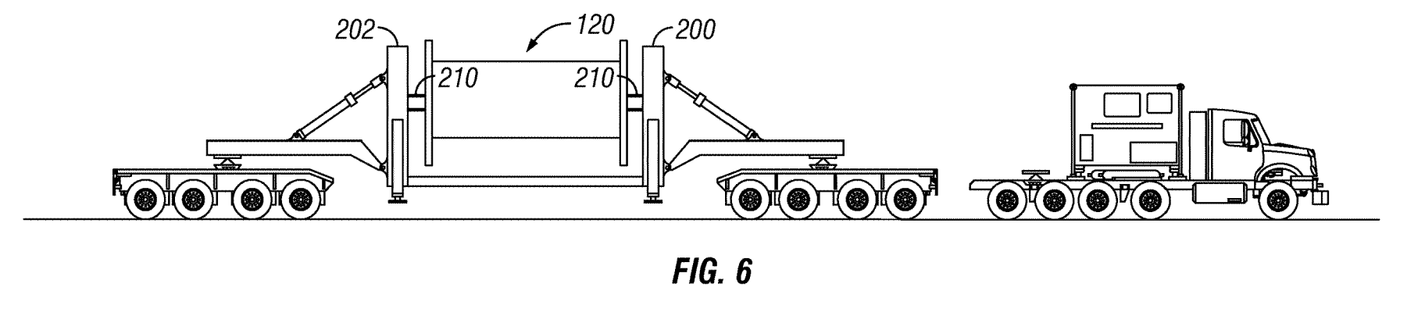
FIG. 6 is an example of a spool support frame deployed for transportation.
Figure 7:
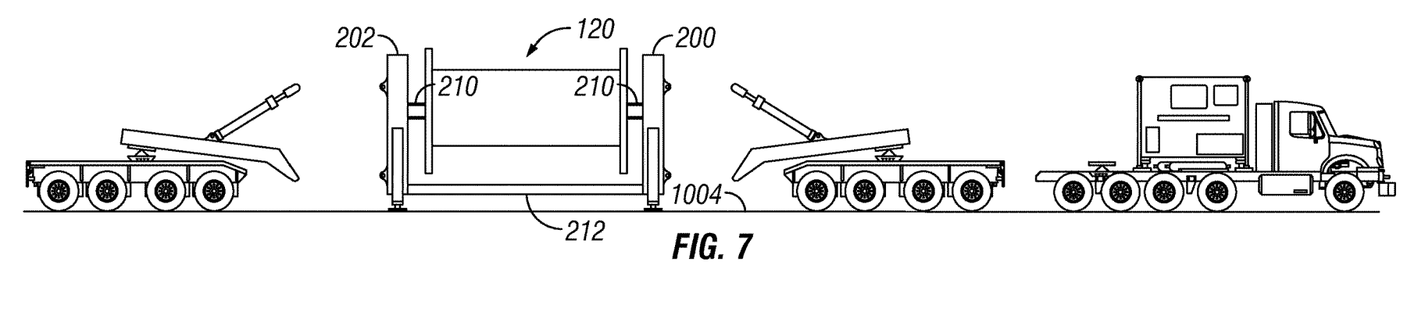
FIG. 7 is an example of a spool support frame removed from a transportation system.

FIGS. 6 and 7 illustrate an example of spool support frame 120 which may include a lateral support 212. In examples, lateral support 212 may be also identified as a beam. There may be any number of lateral supports 212. Each lateral support 212 may be telescopic to accommodate any size of cargo 204 and fit to a customs size for each size of cargo 204. Lateral support 212 may attach forward receiver 200 and aft receiver 202, which may remove structural load from spool support frame 120. In some examples, lateral support 212 may stretch the width of forward receiver 200 and aft receiver 202. However, the width of lateral support 212 may be any suitable width to support cargo 204. In examples, sprockets 210 may attach cargo 204 to forward receiver 200 and aft receiver 202. As further illustrated in FIG. 7, spool support frame 120 may be disposed on surface 1004 during work operations. To perform work operations, forward bogie 116 and aft bogie 118 may be detached from spool support frame 120, which may allow forward bogie 116 and aft bogie 118 to perform other operations.

Figure 8:
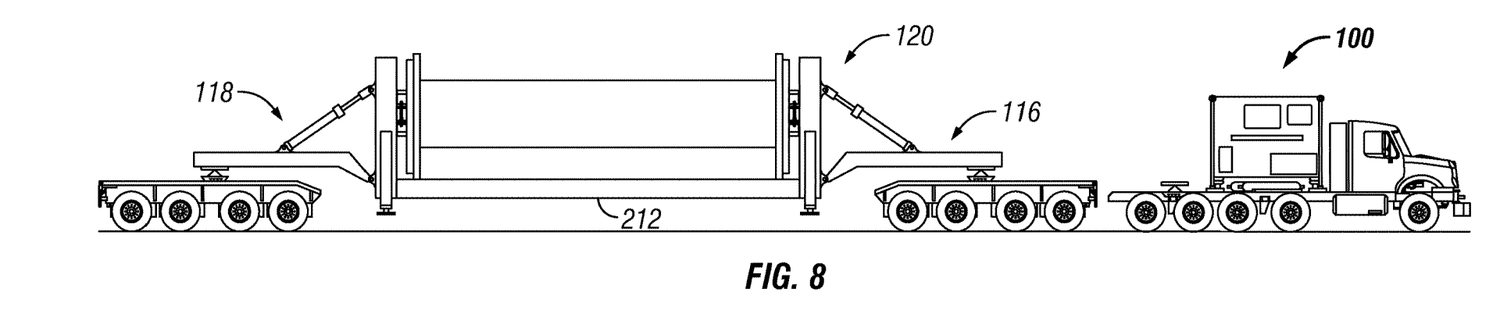
FIGS. 8 and 9 are different example of spool support frames secured in a transportation system.
Figure 9:
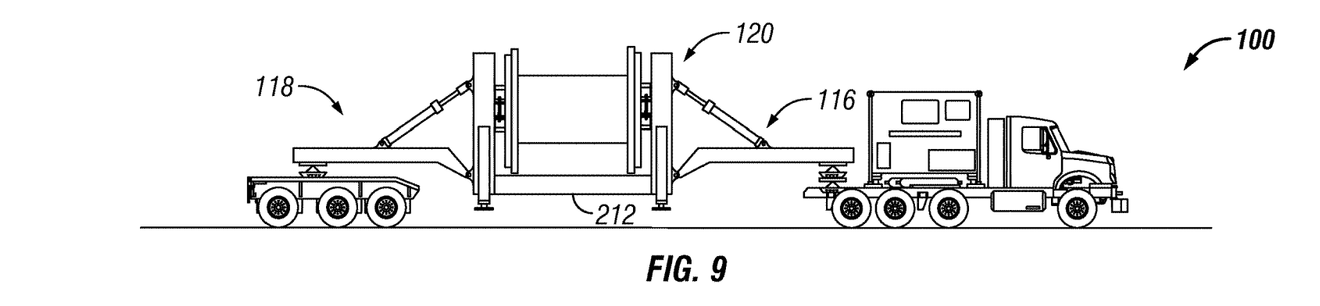

FIGS. 8 and 9 illustrate different lengths of spool support frame 120 which may be handled by transportation system 100. While FIGS. 8 and 9 illustrate spools housed in spool support frame 120, as discussed above, may be any type of tool, material, and/or device. Furthermore, as wells are drilled deeper horizontally and/or vertically, longer coiled tubing may be useful for downhole operations. To provide longer runs of coiled tubing to well sites, wider spools of coiled tubing may need to be transported from one location to another location. Currently, transportation means may be limited to the width of the spool when traveling down busy roads. FIGS. 8 and 9 illustrate individual examples where the width of the spool no longer is an issue, which may allow wider spools to be transported to job sites with ease. In some examples, spool support frame 120 may increase in length due to one or more lateral supports 212. Any length of spool support frame 120 may attach to transportation system 100 through forward bogie 116 and aft boogie 118, as discussed above.

Figure 10A:
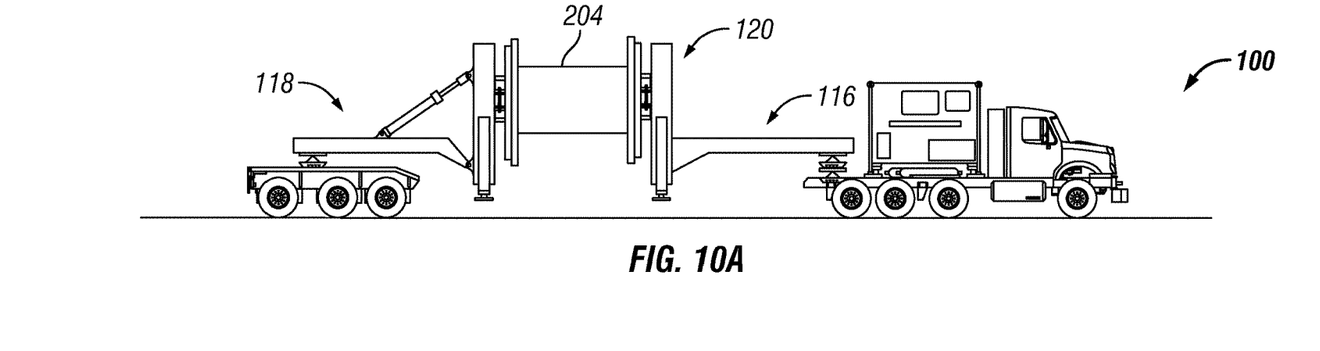
FIGS. 10A-10D are additional examples of spool support frames secured in a transportation system with a modified forward roller bogie.
Figure 10B:
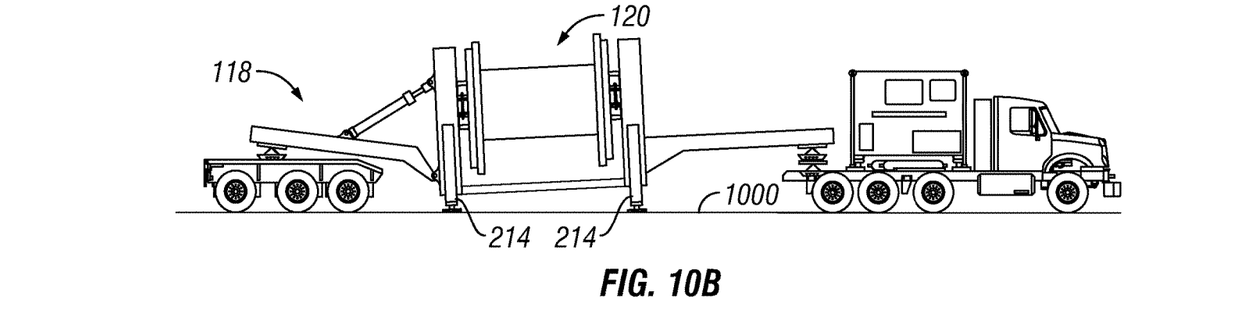
Figure 10C:
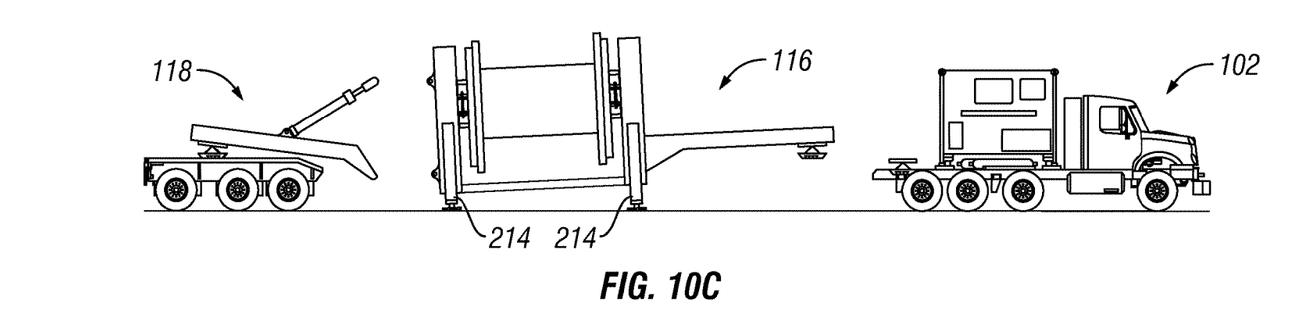
Figure 10D:
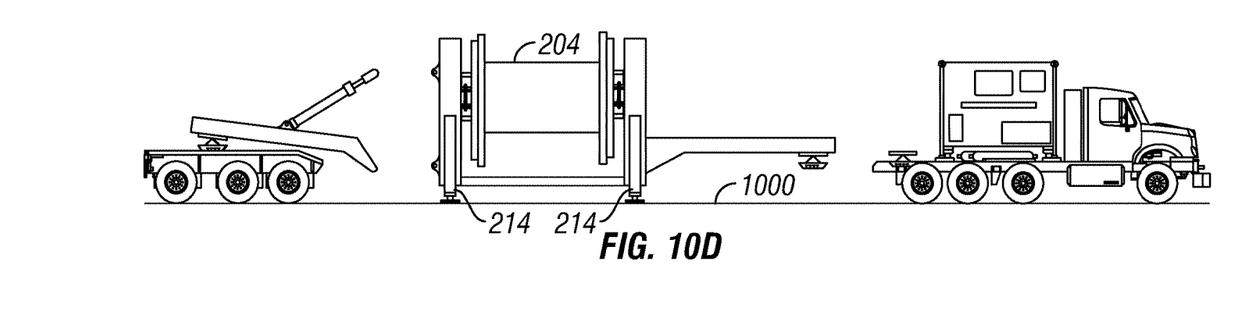

FIGS. 10A-10D illustrate another example of transportation system 100 with a modified forward bogie 116. In this example, forward bogie 116 may be a support structure without wheels. In examples, the support structure may be referred to as a "goose neck," beam, support arm, and/or the like. As illustrated, forward bogie 116, in this example, is a solid frame with a solid structure. FIG. 10A illustrates transportation operations in which cargo 204 is disposed in spool support frame 120. Spool support frame 120 and forward bogie 116 are a single system with aft boogie 118 attached to spool support frame 120 as described above. FIGS. 10B-10D illustrate unloading operations. In FIG. 10B aft boogie 118 may lower spool support frame 120, which may cause spool support frame 120 to tilt. The tilt may be due to forward boogie 116 being a solid structure with spool support frame 120. Outriggers 214 disposed on spool support frame 120 may be extended to surface 1000 to support spool support frame 120. Once spool support frame 120 is supported by outriggers 214, aft boogie 118 may be detached from spool support frame 120. Additionally, tractor section 102 may detach from forward bogie 116, as illustrated in FIG. 10C. Detached, outriggers 214 may lower spool support frame 120 to be level with surface 1000, as illustrated in FIG. 10D. This may allow spool support frame 120 to be utilized for downhole operations and/or operation for cargo 204.

Figure 11:
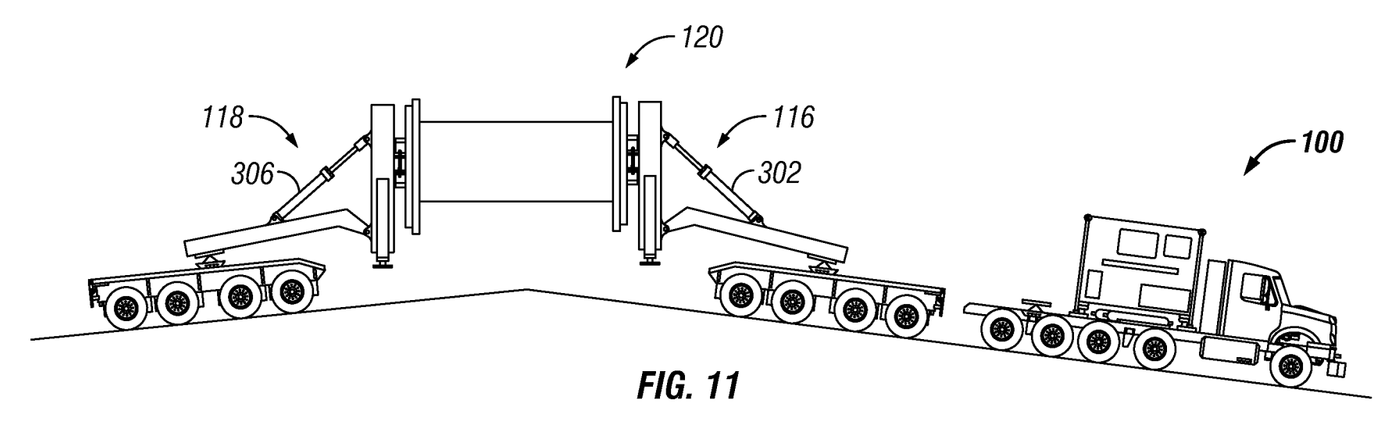
FIG. 11 is an example of a transportation system moving over a high point.

FIG. 11 illustrates an example of transporting cargo 204 housed in spool support frame 120 over high spots in a road and/or surface. Forward bogie 116 and aft boogie 118 may function together to allow cargo 204 to clear high spots in a road and/or a surface. The loading methods utilizing forward armature 302 and aft armature 306, described above, may allow for spool support frame 120 to be raised and lowered as required to clear any road obstructions.

Figure 12:
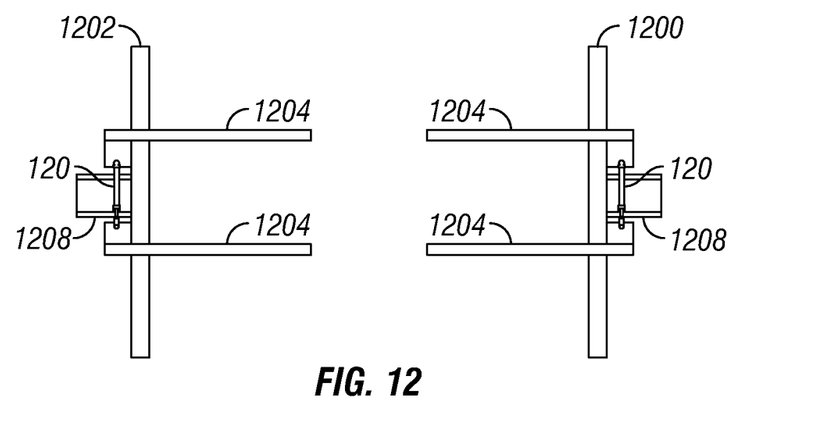
FIG. 12 is an example of a forward spool connector and an aft spool connector.

FIG. 12 illustrates another example for transporting cargo 204 without the use of spool support frame 120 (e.g., referring to FIGS. 1 and 2). As illustrated in FIG. 12, a forward spool connector 1200 may attach to forward bogie 116 and aft spool connector 1202 may attach to aft bogie 118 to support cargo 204 (e.g., referring to FIGS. 1 and 2). As illustrated, both forward spool connector 1200 and aft spool connector 1202 may be structural supports that function to support the operation of forks 1204. Forks 1204 may be elongated structures that adjust outward from forward spool connector 1200 and aft spool connector 1202 at about a ninety-degree angle. In examples, forks 1204 may be solid pins, solid beams, and/or the like, which may support weight from cargo 204 (e.g., referring to FIGS. 1 and 2). In examples, forks 1204 may traverse the length of cargo 204 or at least a portion of cargo 204. Furthermore, forks 1204 may be moveable and may traverse along the structure or forward spool connector 1200 and/or the structure of aft spool connector 1202 with assistance from one or more hydraulic fork pistons 1206, which may operate to move individual forks 1204 toward each other and/or away from each other. Hydraulic fork pistons 1206 may be controlled by any suitable hydraulic system (not illustrated) which may be controlled by operations cabin 108 (e.g., referring to FIGS. 1 and 2). It should be noted that forks 1204 may be disposed within a spool to allow the rotation of the spool. Additionally, forward spool connector 1200 and aft spool connector 1202 may include a locking mechanism (not illustrated) which may prevent forward spool connector 1200 and aft spool connector 1202 and thus cargo 204 from rotating during transportation. FIG. 12 further illustrates sprockets 1208, which may attach forward spool connector 1200 to forward bogie 116 and aft spool connector 1202 to aft bogie 118. Sprockets 1208 may function by allowing cargo 204 to rotate. In examples, coiled tubing (not illustrated) may un-spool or be spooled as sprockets 1208 rotate a spool as cargo 204.

Figure 13:
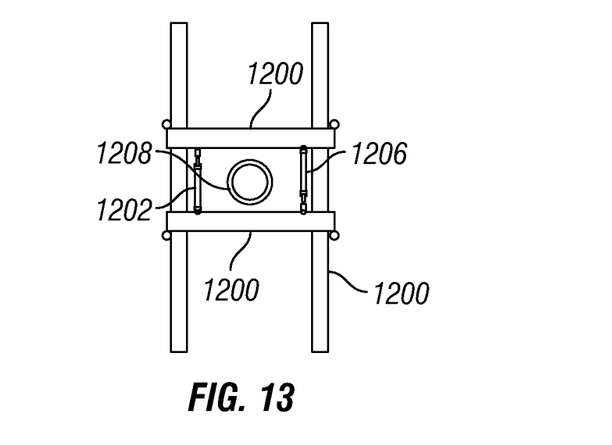
FIG. 13 is a side view of the forward spool connector of FIG. 12.
Figure 14:
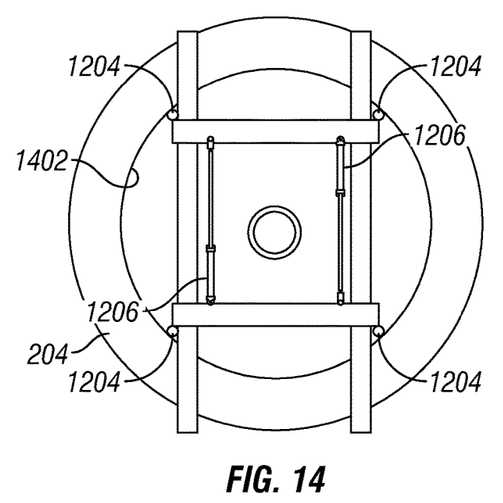
FIG. 14 is a side view of a forward spool connector with a large core outer dimension spool.
Figure 15:
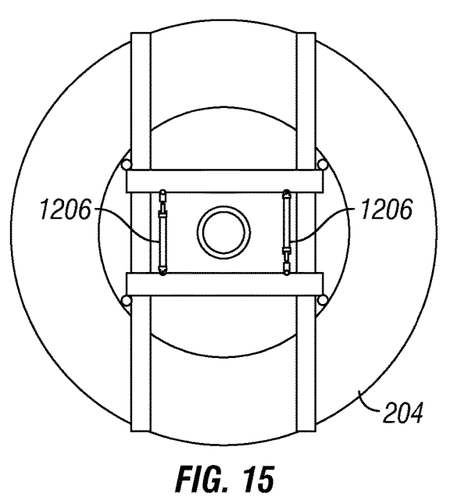
FIG. 15 is a side view of a forward spool connector with a small core outer dimension spool.

FIG. 13 illustrates a side view of forward spool connector 1200, which may provide a structural support for sprocket 1208, one or more forks 1204, and hydraulic fork pistons 1206. As illustrated, hydraulic fork pistons 1206 may be in a closed position. As discussed above, hydraulic fork pistons 1206 may be attached to a hydraulic system (not illustrated), which may be controlled by operations cabin 108 (e.g., referring to FIG. 1). During loading operations for cargo 204 (e.g., referring to FIG. 2), hydraulic fork pistons 1206 may be actuated by the hydraulic system to separate one or more forks 1204 to fit cargo 204. For example, in FIG. 14, hydraulic fork pistons 1206 have been extend, which may move forks 1204 away from each other. Forks 1204 may be square, to have a rounded edge, which may allow forks 1204 to seat against an inner surface 1402 of an inner diameter of the spool (i.e., cargo 204). It should be noted that spool may also be referred to as a reel in examples. FIG. 15 further illustrates that hydraulic fork pistons 1206 may be closed and/or expanded to adapt to any size of spool.

Figure 16:
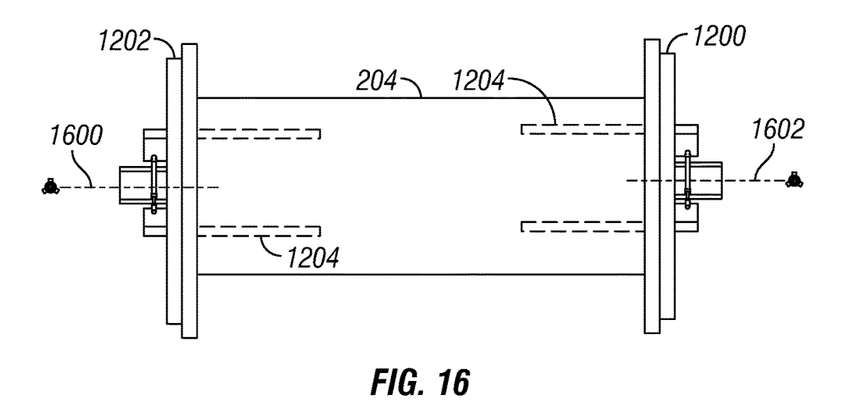
FIG. 16 is a schematic diagram of cargo disposed between a forward spool connector and an aft spool connector.

FIG. 16 illustrates cargo 204 disposed between forward spool connector 1200 and aft spool connector 1202. As illustrated, a spool is cargo 204, however, as discussed above, cargo may be any type of tool, material, and/or device. The spool may be kept in position for and/or during transportation by one or more forks 1204, which may be attached to forward spool connector 1200 and aft spool connector 1202, as discussed above. Additionally, cargo 204 may have a pumping line 1600 and/or a communications line 1602 disposed within the spool and attached to coiled tubing (not illustrated) which may be spooled around the reel. Communications line 1602 may be attached to operations cabin 108 (e.g., referring to FIG. 1)

Figure 17:
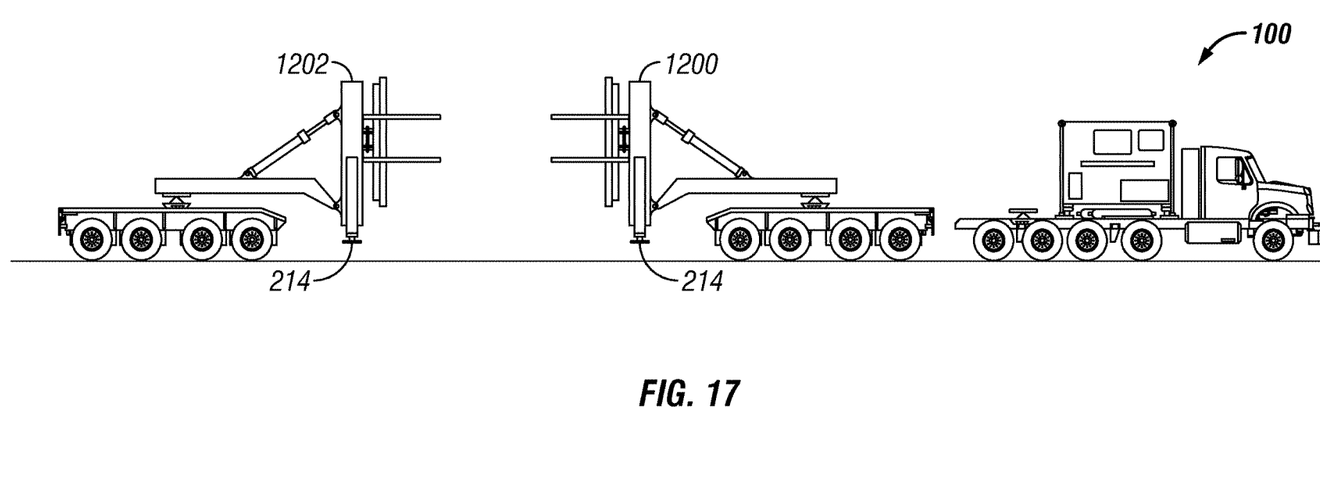
FIGS. 17-21 illustrate a loading operation using a forward spool connector and an aft spool connector.
Figure 18:
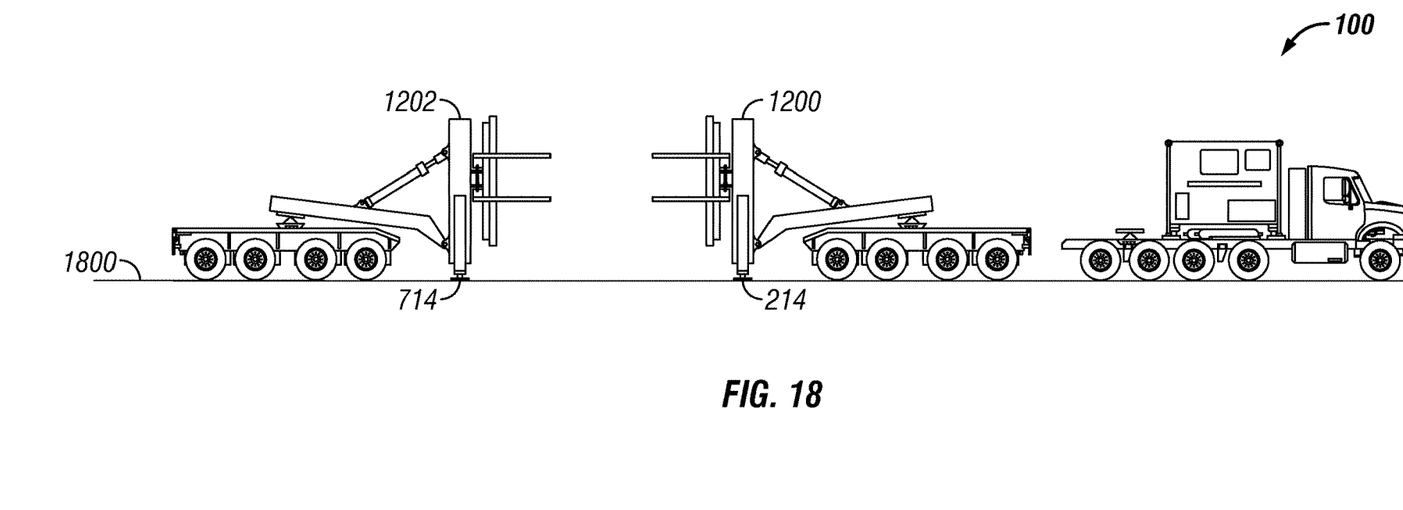
Figure 19:
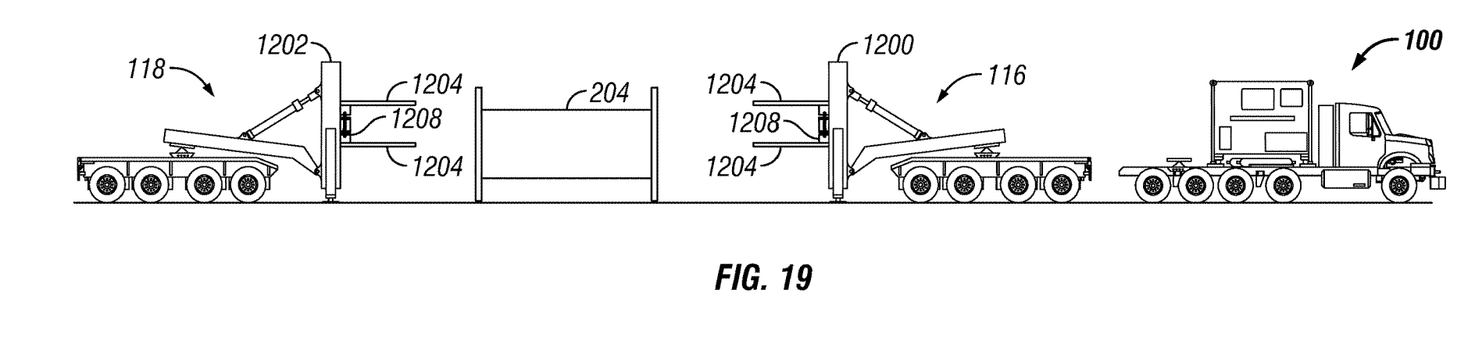
Figure 20:
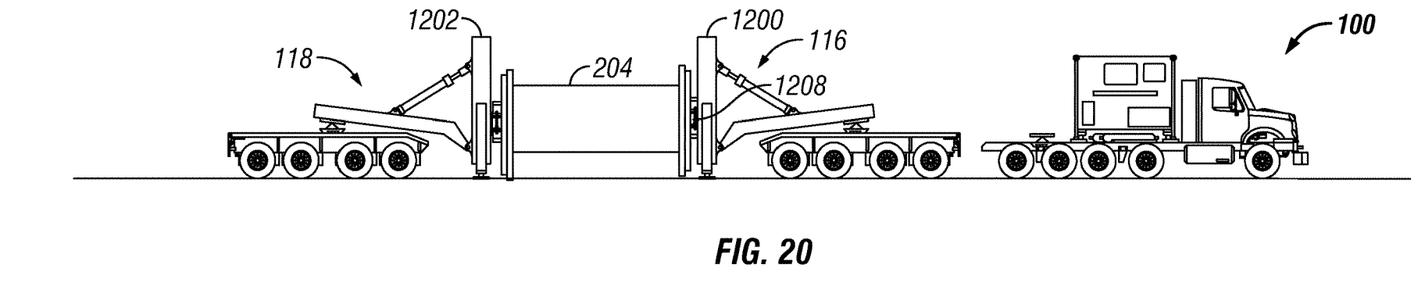

FIGS. 17-21 illustrate a method for loading cargo 204 on transportation system 100 utilizing forks 1204 (e.g., referring to FIG. 12), discussed above. FIG. 17 illustrates transportation system 100 preparing to load cargo 204 (e.g., referring to FIG. 1 or 2) with forward spool connector 1200 and aft spool connector 1202. As illustrated in FIG. 17, outriggers 214 are in a retracted position, which may be suitable during transportation operations. FIG. 18 illustrates aft armature 306 and forward armature 302 in a retracted position allowing outriggers 214 in touch with surface 1800. This may allow forward spool connector 1200 and aft spool connector 1202 to be lowered to surface 1800 to prepare for loading cargo 204 (e.g., referring to FIG. 2). FIG. 19 illustrates cargo 204 has been disposed between forward bogie 116 and aft bogie 118. Both forward bogie 116 and aft bogie 118 may be maneuvered to connect forks 1204 and sprocket 1208 to cargo 204. FIG. 20 illustrates cargo 204 attached to forward spool connector 1200, aft spool connector 1202, and sprocket 1208. Further illustrated in FIGS. 18, 19 and 20, both forward bogie 116 and aft bogie 118 have been lowered to receive cargo 204.

Figure 21:
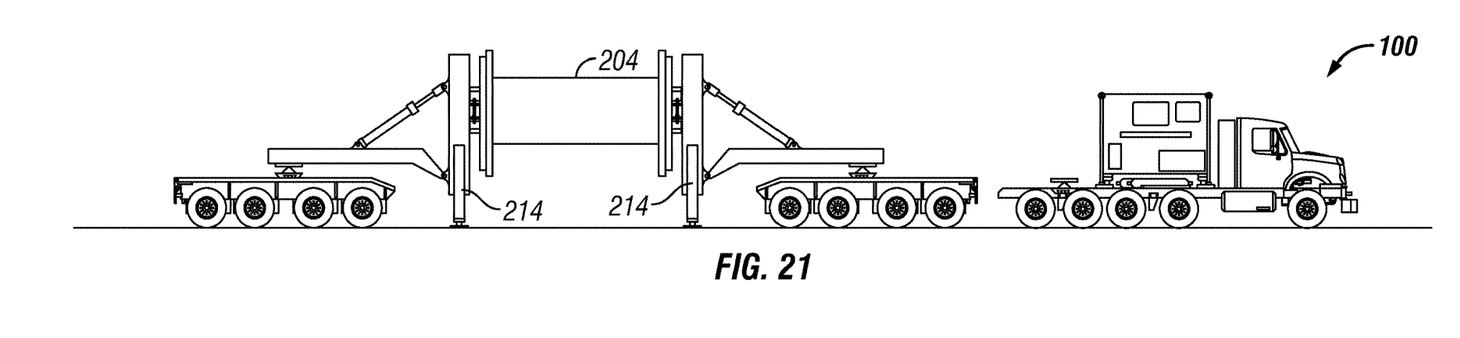

FIG. 21 illustrates cargo 204 has been lifted into place for transportation operations. During lifting operations aft armature 306 and forward armature 302 may extend as described above to pull cargo 204 upward. Additionally, outriggers 214 have been contracted into place for transportation. All downward force exerted by cargo 204 may traverse through aft armature 306 and forward armature 302 into forward bogie 116 and aft bogie 118, respectively. This may allow for transportation system 100 to move to a work site for which cargo 204 may be utilized.

Figure 22:
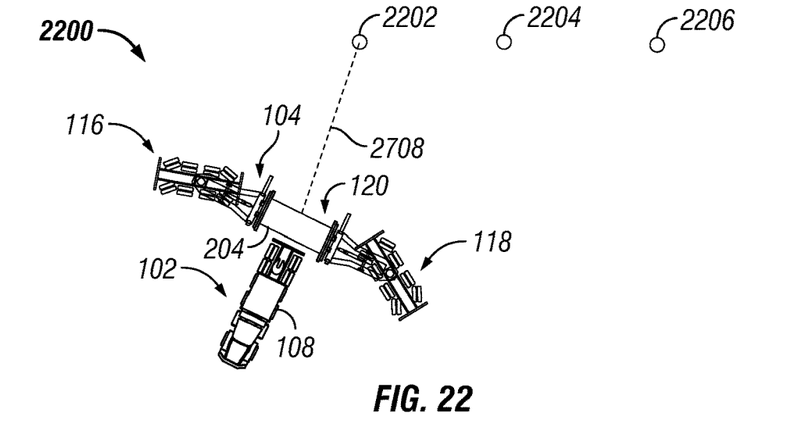
FIGS. 22-24 illustrate a method for performing a coiled tubing operation.
Figure 23:
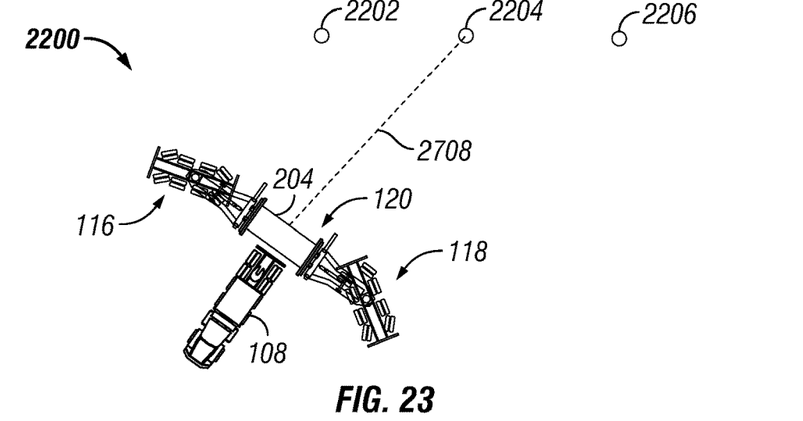
Figure 24:
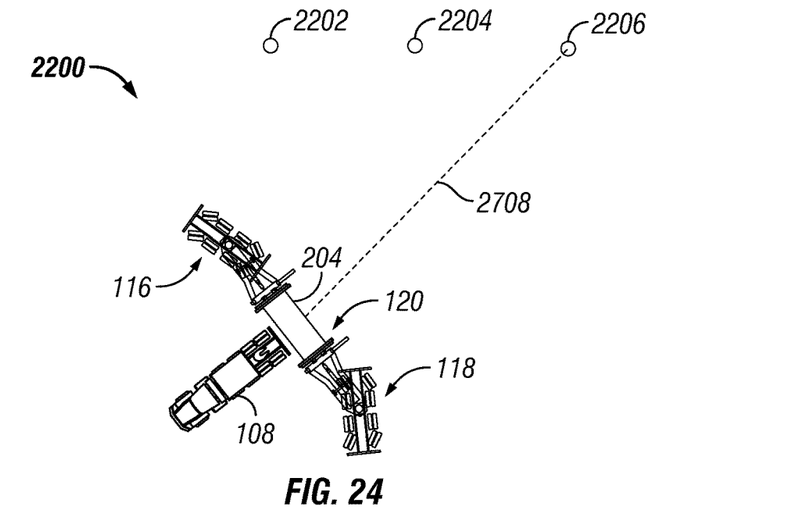

FIGS. 22-24 illustrate a coil tubing operation 2200, which may be performing services on a first well 2202, a second well 2204, and/or a third well 2206 with coiled tubing 2708. As illustrated, tractor section 102 may be disposed about perpendicular to trailer section 104. Operations cabin 108 may control the coil tubing operation and may be attached to and/or control cargo 204 hydraulically, pneumatically, and/or electrically. It should be noted, while operations cabin 108 is illustrated attached to tractor section 102, in other examples operation cabin may be disposed between cargo 204 and each well. Cargo 204 may be suspended from forward bogie 116 and aft bogie 118 within spool support frame 120. As discussed above, cargo 204 may support coiled tubing which may be un-wound from cargo 204 through rotation. Operations cabin 108 may control hydraulic systems attached to spool support frame 120. This may allow personnel to rotate cargo 204 and un-wind coiled tubing from cargo 204. Additionally, once well operations may be completed, cargo 204 may be rotated through hydraulic means to wind coiled tubing around cargo 204. It should be noted that spool support frame 120 may be suspended by forward bogie 116 and aft bogie 118 during working operations or may be disposed on the surface, as described above.

During operations, forward bogie 116 and aft bogie 118 may be controlled separated from tractor section 102 to efficiently move cargo 204 around a location. As discussed above, both forward bogie 116 and aft bogie 118 may have independent steerable axles, which may allow for forward bogie 116 and aft bogie 118 to maneuver between well slots in tight locations. This may allow cargo 204 to service multiple wells from one area by pivoting forward bogie 116 and aft bogie 118.

As discussed above, transportation system 100 (e.g., referring to FIG. 1) may provide many improvements over current technology. For example, current coiled tubing reel transporters place the spool in line with the trailer. The trailer structure supports the weight of the coiled tubing pipe, increasing overall road weight of the unit. Other transverse spool designs are skids placed on a low bed and offloaded on location for the job. Transportation system 100 may allow for the attachment of coiled tubing spool (i.e., cargo) along the axial length of transportation system 100. Attaching cargo 204 (e.g., referring to FIG. 2) along the axial length of transportation system 100 may allow for cargo 204 of increased length to be transported to any suitable location. Additionally, cargo 204 may be accessed and operated while attached to forward bogie 116 or aft boogie 118 (e.g., referring to FIG. 1). Cargo 204 may be suspended or disposed on the ground during work operations.

Furthermore, standardization of trailer globally for multiple coiled tubing reel sizes, from shallow coiled tubing job, to extended reach given that there is no limitation of pipe size and length able to be transported. Crane availability at an operational location is limited to picking up and supporting an injector. The embodiments described above elimination crane requirements that may currently be needed for offloading reels for downhole operations. Maneuverability of trailer section 104 with forward bogie 116 and aft bogie 118 may allow for placement of the spool in front at the center of a well in a tight space which is seen in many well locations.

The systems and methods may include any of the various features of the systems and methods disclosed herein, including one or more of the following statements.

Statement 1: A method may comprise attaching a spool support frame to a forward bogie and an aft bogie, including attaching the spool support frame to the forward bogie through a forward arm and a forward hydraulic arm, and attaching the spool support frame to the aft bogie through an aft arm and an aft hydraulic arm, wherein the spool support frame holds a cargo. The method may further include lifting the cargo, supported by the spool support frame, with the forward hydraulic arm and the aft hydraulic arm.

Statement 2. The method of statement 1, further comprising stabilizing the spool support frame with one or more outriggers, wherein the one or more outriggers are on the spool support frame.

Statement 3. The method of statement 2, further comprising retracting the one or more outriggers after the step of lifting the cargo.

Statement 4. The method of statements 1 or 2, the forward bogie and the aft bogie each include a plurality of axel groups.

Statement 5. The method of statements 1 or 2, further comprising rotating a spool on the spool support frame and winding a coiled tubing around the spool.

Statement 6. The method of statement 5, further comprising lowering one or more outriggers from the spool support frame to ground to prevent the forward bogie and the aft bogie from tipping as the spool rotates.

Statement 7. The method of statement 6, further comprising raising or lowering the spool support frame with the forward hydraulic arm and the aft hydraulic arm.

Statement 8. A method may comprise placing a forward bogie and an aft bogie at a well site, including attaching the forward bogie and the aft bogie to a spool support frame and holding cargo with the spool support frame, and moving the forward bogie with a tractor head. The forward bogie may include a plurality of axel groups configured to operate independently of each other, a forward arm attached to the forward bogie through a swivel connection, and a forward hydraulic arm attached to the forward arm through a rod. The method may further include moving the aft bogie with the tractor head. The aft bogie may include a plurality of aft axel groups configured to operate independently of each other, an aft arm attached to the aft bogie through an aft swivel connection, and an aft hydraulic arm attached to the aft arm through an aft rod.

Statement 9. The method of statement 8, further comprising lowering one or more outriggers from the spool support frame to prevent the forward bogie and the aft bogie from tipping as the cargo rotates.

Statement 10. The method of statement 9, further comprising rotating the cargo to unwind a coiled tubing from the cargo into a well.

Statement 11. The method of statement 10, further comprising performing a well operation with the coiled tubing.

Statement 12. The method of statement 10, further comprising controlling rotation of the cargo with an operations cabin located on the tractor head.

Statement 13. The method of statements 8 or 9, further comprising moving the forward bogie and the aft bogie with the tractor head to move the cargo cradle to a second well.

Statement 14. The method of statements 8 or 9, further comprising lowering the cargo to ground before performing a well operation.

Statement 15. A transportation system may comprise a forward bogie, wherein the forward bogie includes a plurality of axel groups configured to operate independently of each other, a forward arm attached to the forward bogie through a swivel connection, and a forward hydraulic arm attached to the forward arm through a rod. The transportation system may further includes an aft bogie, wherein the aft bogie may include a plurality of aft axel groups configured to operate independently of each other, an aft arm attached to the aft bogie through an aft swivel connection, and an aft hydraulic arm attached to the aft arm through an aft rod. The transportation system may further include a spool support frame attached to the forward arm, the forward hydraulic arm, the aft arm, and the aft hydraulic arm.

Statement 16. The system of statement 15, further comprising one or more outriggers on the spool support frame.

Statement 17. The transportation system of statements 15 or 16, wherein the spool support frame includes one or more lateral beams.

Statement 18. The transportation system of statements 15-17, wherein the spool support frame includes a forward receiver and an aft receiver.

Statement 19. The transportation system of statement 18, wherein the forward receiver is attached to the forward arm and the forward hydraulic arm and the aft receiver is attached to the aft arm and the aft hydraulic arm.

Statement 20. The transportation system of claim 15-18, further comprising a tractor head, wherein the tractor head is attached to the forward bogie and is configured to tow the forward bogie.

The preceding description provides various embodiments of systems and methods of use which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

Therefore, the present embodiments are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
    attaching a spool support frame, that is detachable, to a forward bogie and an aft bogie, including attaching the spool support frame to the forward bogie through a forward arm and a forward hydraulic arm, and attaching the spool support frame to the aft bogie through an aft arm and an aft hydraulic arm, wherein the spool support frame holds a cargo; and
    lifting the cargo supported by the spool support frame with the forward hydraulic arm and the aft hydraulic arm.

2. The method of claim 1, further comprising stabilizing the spool support frame with one or more outriggers, wherein the one or more outriggers are on the spool support frame.

3. The method of claim 2, further comprising retracting the one or more outriggers after the step of lifting the cargo.

4. The method of claim 1, the forward bogie and the aft bogie each include a plurality of axel groups.

5. The method of claim 1, further comprising rotating a spool on the spool support frame and winding a coiled tubing around the spool.

6. The method of claim 5, further comprising lowering one or more outriggers from the spool support frame to ground to prevent the forward bogie and the aft bogie from tipping as the spool rotates.

7. The method of claim 6, further comprising raising or lowering the spool support frame with the forward hydraulic arm and the aft hydraulic arm.

8. A method comprising;
    placing a forward bogie and an aft bogie at a well site, including attaching the forward bogie and the aft bogie to a spool support frame and holding cargo with the spool support frame;
    moving the forward bogie with a tractor head, the forward bogie including:
        a plurality of axel groups configured to operate independently of each other;
        a forward arm attached to the forward bogie through a swivel connection; and
        a forward hydraulic arm attached to the forward arm through a rod; and
    moving the aft bogie with the tractor head, the aft bogie including:
        a plurality of aft axel groups configured to operate independently of each other;
        an aft arm attached to the aft bogie through an aft swivel connection; and
        an aft hydraulic arm attached to the aft arm through an aft rod.

9. The method of claim 8, further comprising lowering one or more outriggers from the spool support frame to prevent the forward bogie and the aft bogie from tipping as the cargo rotates.

10. The method of claim 9, further comprising rotating the cargo to unwind a coiled tubing from the cargo into a well.

11. The method of claim 10, further comprising performing a well operation with the coiled tubing.

12. The method of claim 10, further comprising controlling rotation of the cargo with an operations cabin located on the tractor head.

13. The method of claim 8, further comprising moving the forward bogie and the aft bogie with the tractor head to move the cargo cradle to a second well.

14. The method of claim 8, further comprising lowering the cargo to ground before performing a well operation.

15. A transportation system comprising:
    a forward bogie, wherein the forward bogie includes:
        a plurality of axel groups configured to operate independently of each other;
        a forward arm attached to the forward bogie through a swivel connection; and
        a forward hydraulic arm attached to the forward arm through a rod; and
    an aft bogie, wherein the aft bogie includes:
        a plurality of aft axel groups configured to operate independently of each other;
        an aft arm attached to the aft bogie through an aft swivel connection; and
        an aft hydraulic arm attached to the aft arm through an aft rod; and
    a spool support frame attached to the forward arm, the forward hydraulic arm, the aft arm, and the aft hydraulic arm.

16. The system of claim 15, further comprising one or more outriggers on the spool support frame.

17. The transportation system of claim 15, wherein the spool support frame includes one or more lateral beams.

18. The transportation system of claim 15, wherein the spool support frame includes a forward receiver and an aft receiver.

19. The transportation system of claim 18, wherein the forward receiver is attached to the forward arm and the forward hydraulic arm and the aft receiver is attached to the aft arm and the aft hydraulic arm.

20. The transportation system of claim 15, further comprising a tractor head, wherein the tractor head is attached to the forward bogie and is configured to tow the forward bogie.

* * * * *